United States Patent Office 2,964,527
Patented Dec. 13, 1960

2,964,527
18-O-HETERO ESTERS OF RESERPINE ACID METHYL ESTER

Emil Schlittler, Madison, N.J., assignor to Ciba Pharmaceutical Products, Inc., Summit, N.J., a corporation of New Jersey No Drawing. Filed Nov. 14, 1957, Ser. No. 696,337

6 Claims. (Cl. 260—287)

This application is a continuation-in-part of my co-pending application Serial No. 526,780, filed August 5, 1955, now U.S. Patent No. 2,824,874, issued February 25, 1958, which in turn is a continuation-in-part application of my application Serial No. 376,984, filed August 27, 1953 (now abandoned), which in turn is a continuation-in-part application of my application Serial No. 373,461, filed August 10, 1953 (now abandoned), which in turn is a continuation-in-part application of my application Serial No. 361,879, filed June 15, 1953 (now abandoned), which in turn is a continuation-in-part application of my application Serial No. 353,920, filed May 8, 1953 (now abandoned).

The present invention relates to a new series of diesters of reserpic acid and salts thereof, as well as the preparation of such compounds.

From investigations I made jointly with J. Mueller and H. J. Bein, it is known that from Rauwolfia serpentina Benth. an alkaloid having sedative action can be isolated in pure form which is called reserpine [Experientia, volume VIII, page 338 (1952)]. Reserpine also has a pronounced hypotensive action and is of great therapeutic importance. The alkaloid itself and the process of its preparation are more thoroughly described in U.S. patent application Serial No. 367,357, filed on July 10, 1953, now U.S. Patent No. 2,752,351, issued on June 26, 1956 to me and Johannes Mueller.

I have made the observation that when reserpine is treated with certain agents described below, a carboxylic acid is obtained, to which I have given the name reserpic acid. My investigations have shown that in addition to the free carboxyl group reserpic acid has a free hydroxyl group and can be represented by the formula:

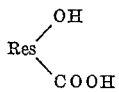

wherein the radical "Res" stands for the divalent organic radical bound to the free hydroxyl and carboxyl groups in the reserpic acid.

Reserpic acid has the following physical characteristics: Melting point 239–245° C.; ultraviolet spectrum (in ethanol), maxima at $\lambda=224$ m$\mu$ ($\epsilon=31,000$), 270 m$\mu$ ($\epsilon=5,040$) 294 m$\mu$ ($\epsilon=6,520$); minima at $\lambda=250$ m$\mu$ ($\epsilon=3,440$); 280 m$\mu$ ($\epsilon=4,210$); infrared spectrum (in "Nujol"), absorption bands at 3520–3480 (incline), 3240 (broad band), 2900, 2850 (broad band), 1625, 1605–1585 (broad band), 1570, 1505, 1465, 1395, 1378, 1365, 1317, 1280, 1242, 1221 (flat) 1201, 1163, 1140, 1108, 1078, 1028, 973, 950, 905, 829, 804, 750, 720. The microanalysis gives the following values in percent: C=65.66; H=7.33; N=6.98; empirical formula:

$$C_{22}H_{28}O_5N_2$$

The radical "Res" in the above structural formula has, therefore, the empirical formula: $C_{21}H_{26}O_2N_2$.

My investigations have further disclosed the fact that by conversion of the carboxyl group of reserpic acid into a carbomethoxy group methyl reserpate (reserpic acid methyl ester) of the formula

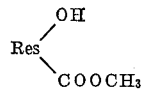

is formed, which can be converted into reserpine of the formula

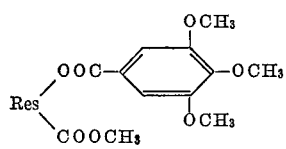

by esterification of the free hydroxyl group with 3,4,5-trimethoxy-benzoic acid.

The present invention relates particularly to esters of methyl reserpate with heterocyclic carboxylic acids in which the heterocyclic carboxylic acid is particularly a monocyclic heterocyclic carboxylic acid such as, for example, a carboxylic acid containing a furane ring, e.g. 2-furane carboxylic acid, or 3-(2-furyl)-acrylic acid; a carboxylic acid containing a pyridine ring, e.g. nicotinic, isonicotinic or picolinic acid; a carboxylic acid containing a thiophene ring e.g. thienoic acid; or also a bicyclic heterocyclic carboxylic acid such as a quinoline carboxylic acid, e.g. quinoline 6-carboxylic acid.

The new esters of this invention show hypotensive and sedative properties and may be used to lower the blood pressure in hypertensive conditions and to relieve states of anxiety and stress. In contrast to reserpine the new esters of methyl reserpate with heterocyclic acids are more easily water-soluble and are therefore absorbed more readily and completely than reserpine.

The first stage of the process of this invention for the preparation of said compounds comprises subjecting reserpine to the action of an alkaline saponifying medium. Depending on the procedure which is followed, it is possible to split both ester groups or to saponify reserpine partially, splitting but the esterified hydroxyl group. To achieve one or the other end, one may work with different alkaline saponifying agents or with the same, but under different conditions, such as, for example, in the presence or absence of water, at a lower or higher temperature or for a longer or shorter period of time. For example, when reserpine is heated for a comparatively long time with the solution of an alkali metal hydroxide, such as potassium hydroxide, in an alcohol, such as methanol, both ester groups are hydrolyzed. When the treatment is performed with the same agent under milder conditions, e.g. over a short period, only the esterified hydroxyl group is split.

For partial saponification, however, reserpine is advantageously hydrolized with a saponifying agent capable of converting an esterified hydroxyl group into a free hydroxyl group with simultaneous reesterification of any hydrolized carboxyl group, which effect may be achieved by methanolysis. This procedure is described in application Serial No. 376,523, filed August 25, 1953, now U.S. Patent No. 2,786,844, issued March 26, 1957 to Harold B. MacPhillamy and Charles F. Huebner. According to this patent, it is of advantage to treat reserpine with anhydrous methanol in the presence of an alcoholate such as an alkali metal methylate, e.g. sodium methylate, or an aluminum alcoholate, e.g. aluminum tertiary butylate, or some other alcoholizing reagent such as sodium carbonate or piperidine, to form methyl reserpate. For conversion into reserpic acid, the methyl reserpate can be further treated in an alkaline medium, e.g. with an alcohol solution of an alkali metal hydroxide, such as a methanol solution of potassium hydroxide.

Methyl reserpate can also be obtained by treating reserpic acid or a salt thereof with an esterifying agent capable of converting a carboxyl group into a carbomethoxy group. Advantageously reserpic acid or a salt, for example, the hydrochloride, thereof is reacted with diazomethane, or it is esterified with methanol in the presence of acid, such as a hydrohalic acid, e.g. hydrochloric acid.

To prepare the new esters of methyl reserpate with a heterocyclic carboxylic acid, methyl reserpate may be treated with the desired heterocyclic carboxylic acid, preferably in the form of a reactive functional derivative thereof, especially a halide, e.g. chloride, or an anhydride. The reaction is advantageously conducted in the presence of a diluent and/or a condensing agent. When an acid halide is used it is of advantage to work in an anhydrous solvent and in the presence of an acid-binding agent, such as an alkali metal carbonate or alkaline earth carbonate or a strong organic base, such as a tertiary amine e.g. pyridine or collidine. There may be used for example, an acid chloride in pyridine as a solvent.

Depending on the method of working, the new esters are obtained in the form of a base or as a salt thereof. A base may be converted into its therapeutically useful salts with acids, for example, by treating them with inorganic or organic acids, such as hydrohalic acids, e.g. hydrochloric acid; sulfuric acid, phosphoric acid, nitric acid, hydroxyethane sulfonic acid, toluene sulfonic acid, acetic acid, tartaric acid, or citric acid. From a salt, the free base can be obtained, for example, by reaction with silver carbonate. The new esters of methyl reserpate may also crystallize as hydrates, for example, as hemihydrates, monohydrates, sesquihydrates or polyhydrates.

In the afore-described reaction methyl reserpate used as the starting material may also be employed in the form of a salt, for example, as the hydrochloride.

The following examples will serve to illustrate the invention. The relationship of parts by weight to parts by volume being the same as the gram to the milliliter. Temperatures are given in degrees centigrade.

*Example 1*

One part by weight of reserpine is refluxed with 40 parts by volume of 1 N methanolic potassium hydroxide under nitrogen for 1½ hours. The solution is cooled, adjusted to pH 1-2 with 1:1 hydrochloric acid (6 N), and filtered to remove potassium chloride. The filtrate is evaporated almost to dryness, slurried with two 25 parts by volume portions of ether and partially dissolved in 25 parts by volume of methanol. The methanol is evaporated almost to dryness and the residue again extracted with two 25 parts by volume portions of ether. The solid remaining is dissolved in 50 parts by volume of methanol, adjusted with 1 N methanolic potassium hydroxide to about pH 6 and evaporated almost to dryness. Addition of 50 parts by volume of chloroform dissolves the bulk of the solid, leaving potassium chloride. Evaporation of the chloroform extract leaves crude reserpic acid which crystallizes on the addition of a small amount of methanol and warming in a water bath. Ether is added dropwise to complete the crystallization and the crystals are filtered and washed with ether. The reserpic acid thus obtained in the form of the hydrochloride melts at 255–258° C. It has the empirical formula: $C_{22}H_{28}O_5N_2 \cdot HCl$. The hydrochloride is very soluble in water, substantially insoluble in dry chloroform and moderately soluble in methanol-chloroform. It has optical rotations: $[\alpha]_D^{25} = -75°$ (1% $H_2O$) and $[\alpha]_D = -80 \pm 3°$ ($CHCl_3$). The compound analyzes as follows (in percent): C=59.59; H=7.06; N=6.2; Cl=8.12; O=19.03 (by difference). The compound exhibits characteristic absorption bands in the infrared region of the spectrum when suspended in solid form in a hydrocarbon oil (Nujol) at the following frequencies expressed in reciprocal centimeters: 3450 (broad band), 3225, 2915 (broad band), 2850–2880 (flat), 2585 (broad band), 1685, 1630, 1605, 1578, 1511, 1482, 1465, 1450, 1405, 1370, 1350, 1335, 1310, 1290, 1265, 1250, 1230, 1205, 1160, 1145, 1090, 1075, 1055, 1020, 980, 950, 900, 870, 840, 820, 780, 755, 712, 675, and 625. In ethanol, reserpic acid hydrochloride exhibits absorption bands in the ultraviolet region of the spectrum having maxima at 222 m$\mu$ ($\epsilon$=33,330), 268 m$\mu$ ($\epsilon$=5150), 294 m$\mu$ ($\epsilon$=6776); and minima at 248 m$\mu$ ($\epsilon$=2942) and 278 m$\mu$ ($\epsilon$=4146).

Reserpic acid hydrochloride can be converted to the free acid as follows: 0.1 part by weight of reserpic acid hydrochloride is dissolved in 10 parts by volume of ethanol and stirred with 0.125 part of powdered silver carbonate for 10 minutes. The solution is filtered to remove excess silver carbonate and the silver chloride formed, and the filtrate evaporated to dryness, whereupon a pale yellow solid is obtained. Recrystallization from 1–2 parts by volume of methanol yields almost colorless crystals of reserpic acid, M.P. 239–245° C. Analysis: C=65.66, H=7.33, N=6.98, O=20.03 (by difference).

In ethanol the free reserpic acid exhibits absorption bands in the ultraviolet region of the spectrum having maxima at 224 m$\mu$ ($\epsilon$=31,000), 270 m$\mu$ ($\epsilon$=5,040), 294 m$\mu$ ($\epsilon$=6,520); and minima at 250 m$\mu$ ($\epsilon$=3,440) and 280 m$\mu$ ($\epsilon$=4,210). The free reserpic acid exhibits characteristic absorption bands in the infrared region of the spectrum when suspended in solid form in a hydrocarbon oil (Nujol) at the following frequencies expressed in reciprocal centimeters: 3520–3480 (incline), 3240 (broad band), 2900, 2850, (broad band), 1625, 1605–1585 (broad band), 1570, 1505, 1465, 1395, 1378, 1365, 1317, 1280, 1242, 1221 (flat), 1201, 1163, 1140, 1108, 1078, 1028, 973, 950, 905, 829, 804, 750, 720.

The reserpic acid can be converted to the hydrochloride as illustrated by the following example: 0.1 part by weight of reserpic acid is slurried in 5 parts by volume of methanol and the pH adjusted to 3–4 by adding several drops of 1:1 hydrochloric acid. The resulting solution is concentrated under reduced pressure to a small volume, whereupon white crystals are formed. After standing a few minutes, the crystals are filtered off. The reserpic acid hydrochloride thus obtained melts at 257–260° C. The mother liquor, on standing, yields further crystals of reserpic acid hydrochloride.

The free reserpic acid may also be converted into metal salts, for example, the alkali metal salts, as illustrated by the following example: 0.1 part by weight of reserpic acid is mixed with 0.25 part by volume of 1 N methanolic potassium hydroxide. The solution thus obtained is filtered, and the filter washed with 1 part by volume of methanol. To the filtrate is added 25 parts by volume of ether, whereupon potassium reserpate precipitates as a white powder. The salt is collected on a filter and washed once with 5 parts by volume of ether and dried. The salt begins to char at above 200°, is black at 250°, and melts at 270–300°.

Alkaline earth metal salts, e.g. barium and calcium salts can be prepared in a similar manner by employing the appropriate alkaline earth metal bases.

The reserpine employed as the starting material in the above example may be prepared as described in the aforementioned U.S. patent application Serial No. 367,357, filed July 10, 1953, now U.S. Patent No. 2,752,351, issued on June 26, 1956 to me and Johannes Mueller. The following illustrates the process: 7,000 parts by weight of powdered bark obtained from the roots of Rauwolfia serpentina Benth. are percolated with 35,000 parts by volume of methanol. After evaporating the methanol extract, 1,050 parts by weight of a dark colored powder are obtained, which is treated with water repeatedly. The remaining insoluble residue is then treated five times, each time with 1,500 parts by volume of 10% aqueous acetic acid and the solution separated from the oily portion by centrifugation. The brown acetic acid solution is either concentrated at low temperature or diluted with half of its volume of water and then has a pH of about 3.9. This solution is extracted with a total of 3,500 to 4,000 parts by volume of chloroform divided into 3 to 4 portions. The chloroform extracts are washed once with potassium carbonate solution and twice with water, then dried with sodium sulfate and completely evaporated in vacuum. The residue of 70 to 80 parts by weight is a green-brown colored powder. For further processing, this residue is dissolved in benzene and chromatographed on 1,000 to 1,200 parts by weight of neutral aluminum oxide (activity II—III according to the Brockmann standard). By eluting with benzene a small amount of a yellow oil is obtained first and afterwards 0.9 part by weight of a physiologically inactive crystalline material with a M.P. of 238–239° C. and then the sedatively active component follows. As soon as the main part of the active component is eluted, the chromatographic column is then further eluted with a mixture of 2 parts by volume of benzene and 1 part by volume of acetone. By doing so the remainder of the sedative principle is eluted and then physiologically inactive crystalline material with a M.P. 141–143° C. follows. The fractions which contain the sedative factor are evaporated to dryness. By recrystallizing the residue from hot acetone or a mixture of chloroform and ether, 6.5 to 7 parts by weight of residue (reserpine) are obtained in almost colorless crystals melting at 262–263° (with decomposition) and with a rotation $[\alpha]_D = -117°$ (chloroform).

*Example 2*

To a suspension of 1.2 parts by weight of reserpic acid hydrochloride in 50 parts by volume of 50% ether-methanol is added an excess of an ether solution of diazomethane. Nitrogen is evolved and most of the material gradually goes into solution. The reaction mixture is allowed to stand about 18 hours at room temperature and then the excess diazomethane is removed by distillation. The resulting solution is filtered and concentrated to dryness under reduced pressure at not over 40° C. The crystalline residue is recrystallized from methanol-ether solution and yields methyl reserpate, M.P. 240–242°. It has the empirical formula $$C_{23}H_{30}O_5N_2$$

and analyzes in percent as follows: C=66.68; H=7.34; N=7.06; O=18.92 (by difference); $[\alpha]_D = -101 \pm 3°$ (CHCl₃). The compound is insoluble in water, soluble in methanol, ethanol and chloroform. In ethanol, it exhibits absorption bands in the ultraviolet region of the spectrum having maxima at 226 m$\mu$ ($\epsilon$=33,830), 270 m$\mu$ ($\epsilon$=5,090), 298 m$\mu$ ($\epsilon$=6,080); and minima at 252–4 m$\mu$ ($\epsilon$=4,110) and 282 m$\mu$ ($\epsilon$=4,070). The compound exhibits characteristic absorption bands in the infrared region of the spectrum when suspended in solid form in a hydrocarbon oil (Nujol) at the following frequencies expressed in reciprocal centimeters: 3510, 3365, 2850–2950 (broad band), 1724, 1632, 1578, 1500, 1465, 1380, 1362, 1355, 1340, 1332, 1312, 1298, 1268, 1245, 1225, 1202, 1155, 1088, 1068, 1055, 1040, 1030, 1020, 1008, 970, 940, 912, 890, 860, 848, 835, 785, 770, 753, 720, 710, 655 and 625.

*Example 3*

To 50 parts by volume of anhydrous methanol is added 0.1 part by weight of metallic sodium and when the ensuing reaction has ceased, 1.0 part by weight of reserpine is suspended in the solution. The mixture is refluxed for three hours during which time the material gradually dissolves. The solution is then concentrated under reduced pressure at 40–50° to about 15 parts by volume and 50 parts by volume of water is then added. The pH of the solution is adjusted to 4.5–5 by the addition of 10% sulfuric acid. The resulting acid solution is extracted three times with 50 parts by volume portions of ether. The aqueous phase is then made alkaline with concentrated ammonia and the precipitated material taken up in chloroform. The chloroform solution is washed with water, dried and the solvent removed. The resulting oil crystallizes and is identified as methyl reserpate.

*Example 4*

A solution of 5 parts by weight of methyl reserpate and 4.6 parts by volume of 2-furoyl chloride in 100 parts by volume of anhydrous pyridine is allowed to stand at 5° C. for two days. Most of the pyridine is removed under reduced pressure and the residue shaken with 200 parts by volume of ethyl acetate and 40 parts by volume of 5% sodium hydroxide solution. The ethyl acetate phase is then shaken with 40 parts by volume of 5% aqueous hydrochloric acid. The hydrochloride of the methyl O-(2-furoyl)-reserpate begins to crystallize and is filtered after ½ hour. On recrystallization from water it melts at 258–260°. The ester in the form of its free base is obtained by dissolving methyl O-(2-furoyl)-reserpate hydrochloride in 20 parts by volume of a warm 1:9 water-acetone mixture and basifying the resulting solution with aqueous ammonia. On addition of water methyl O-(2-furoyl)-reserpate separates. On recrystallization from acetone-water the free base melts at 240–242° (with decomposition). The compound crystallizes with ½ molecule of water.

*Analysis.*—Theory: C, 65.0; H, 6.38; N, 5.4. Found: C, 65.02; H, 6.36; N, 5.53. The empirical formula for the compound is: $C_{28}H_{32}N_2O_7 \cdot \frac{1}{2}H_2O$.

*Example 5*

A solution of 5 parts by weight of methyl reserpate and 5 parts by volume of nicotinoyl chloride in 100 parts by volume of anhydrous pyridine is allowed to stand at 5° for two days. Most of the pyridine is removed under reduced pressure and the residue shaken with 200 parts by volume of ethyl acetate and 40 parts by volume of 5% aqueous sodium hydroxide. The ethyl acetate phase is next shaken with 40 parts by volume of 5% aqueous hydrochloric acid, whereupon methyl O-nicotinoyl-reserpate hydrochloride is formed in solution. The solution is basified with ammonia and the methyl O-nicotinoyl-reserpate removed by filtration. It is recrystallized from acetone-water to yield the pure methyl O-nicotinoyl-reserpate. M.P. 255–256° (with decomposition).

*Analysis.*—Theory: C, 67.1; H, 6.4; N, 8.1. Found: C, 67.17; H, 6.23; N, 8.02.

The empirical formula for the compound is $$C_{29}H_{33}N_3O_6$$

*Example 6*

A mixture of 8 parts by weight of methyl reserpate and isonicotinoyl chloride hydrochloride, derived from 3 parts by weight of isonicotinic acid by treatment with thionylchloride, in 80 parts by volume of pyridine is allowed to stand for 18 hours at room temperature, and is then poured into an excess of water. A tan precipitate forms, the pH of the solution is adjusted to 8 with aqueous ammonia, and the solid material filtered off, washed with water, then slurried with acetone and filtered again. The methyl O-isonicotinoyl-reserpate is obtained in white needles after recrystallization from a mixture of methanol and methylene chloride, M.P. 286–288.

*Example 7*

A mixture of 8 parts by weight of methyl reserpate and 3.3 parts by weight of 3-(2-furyl)-acryloyl chloride in 60 parts by volume of pyridine is allowed to stand at room temperature for 16 hours and then poured on an excess of water. The solid material is filtered off and the methyl O-[3-(2-furyl)-acryloyl]-reserpate recrystallized from a mixture of ethyl acetate and ether, M.P. 239–243°.

Example 8

A mixture of 6 parts by weight of methyl reserpate and 3 parts by weight of quinoline 6-carboxylic acid chloride hydrochloride in 80 parts by volume of pyridine is allowed to stand at room temperature for 18 hours and under refrigeration for an additional 24 hours. The pyridine is evaporated under reduced pressure and the residue dissolved in chloroform, which solution is washed with 2% aqueous hydrochloric acid. A solid material forms, which is separated and dissolved in methanol, and precipitated on addition of acetone. The thus obtained hydrochloride salt is recrystallized from hot ethanol, and then dissolved in methanol to form the free base by slurrying the solution with 1 part by weight of silver carbonate. The precipitate is filtered off and washed with methylene chloride; the methylene chloride solution is evaporated and the methyl O-(quinolyl-6-carboxyloyl)-reserpate is recrystallized from a mixture of methylene chloride and methanol, M.P. 220-225.

For therapeutical use the new pharmacologically active compounds, for example the methyl O-(2-furoyl)-reserpate or the methyl O-nicotinoyl-reserpate, may be made up into pharmaceutical compositions which comprise them together with a pharmaceutical adjuvant as a carrier. The compositions thus provided by the invention may be in any suitable solid or liquid dosage forms especially in a form suitable for oral or parenteral administration, e.g. tablets, powder, capsules, pills, solutions, emulsions or suspensions, e.g. in the form of ampouled injectable solutions. As pharmaceutical carriers there may be employed materials or mixtures of such which do not react with the new compounds and are therapeutically useful. Substances or mixtures thereof, such as water, gelatine, lactose, starch, magnesium stearate, talc, vegetable oils, benzyl alcohol, ascorbic acid, gums, glycols such as propylene glycol or polyalkylene glycol, petroleum jelly, cholesterol, tragacanth, alcohol or others may be employed. The new compositions contain a therapeutically effective amount of the new compounds per dosage unit, such as for example about 0.1-50 parts by weight, advantageously 0.1-10 parts by weight of methyl O-nicotinoyl-reserpate benzoate. In preparing the novel compositions the new compounds are admixed with the pharmaceutical carrier and formulated in the desired dosage unit form according to pharmaceutical practice. The compositions may be sterilized and may contain auxiliary substances such as preservative, stabilizing, wetting or emulsifying substances, salts for the control of the osmotic pressure or buffer substances or besides the new compounds other therapeutically active substances, for example such as are used in combination with reserpine.

What is claimed is:

1. A member of the group consisting of an ester of methyl reserpate with a member of the group consisting of pyridine carboxylic acid, furan carboxylic acid, furylacrylic acid, thiophene carboxylic acid and quinoline carboxylic acid, and therapeutically acceptable acid addition salts thereof.
2. Methyl O-nicotinoyl-reserpate.
3. Methyl O-isonicotinoyl-reserpate.
4. Methyl O-(2-furoyl)-reserpate.
5. Methyl O-[3-(2-furyl)-acryloyl]-reserpate.
6. Methyl O-(quinolyl-6-carboxyloyl)-reserpate.

References Cited in the file of this patent

UNITED STATES PATENTS

| | | |
|---|---|---|
| 2,752,351 | Schlittler | June 26, 1956 |
| 2,824,874 | Schlittler | Feb. 25, 1958 |

OTHER REFERENCES

Schlittler et al.: Annals of the N.Y. Acad. of Science, vol. 59, p. 7 (1954).